(12) United States Patent
Yoshigashima et al.

(10) Patent No.: US 6,473,938 B1
(45) Date of Patent: Nov. 5, 2002

(54) HINGE

(75) Inventors: Yutaka Yoshigashima, Tokyo; Ken Ono, Mishima, both of (JP)

(73) Assignee: Mizuki Seimitu Co., Ltd. (JP)

( * ) Notice: Subject to any disclaimer, the term of this patent is extended or adjusted under 35 U.S.C. 154(b) by 0 days.

(21) Appl. No.: 09/762,272

(22) PCT Filed: Jul. 17, 1999

(86) PCT No.: PCT/JP99/03221

§ 371 (c)(1),
(2), (4) Date: Apr. 9, 2001

(87) PCT Pub. No.: WO00/79145

PCT Pub. Date: Dec. 28, 2000

(51) Int. Cl.[7] .............................. E05C 17/64; E05D 5/10
(52) U.S. Cl. .......................................... 16/342; 16/386
(58) Field of Search ........................ 16/342, 341, 337, 16/386, 336, 262, 268; 403/297, 300, 86, 91, 103, 104, 109, 290

(56) References Cited

U.S. PATENT DOCUMENTS

| | | | | |
|---|---|---|---|---|
| 5,018,244 A | * | 5/1991 | Hino | 16/337 |
| 5,774,939 A | * | 7/1998 | Lu | 16/273 |
| 5,832,566 A | * | 11/1998 | Quek et al. | 16/342 |
| 5,894,635 A | * | 4/1999 | Lu | 16/342 |
| 6,116,806 A | * | 9/2000 | Chang | 16/342 |
| 6,317,927 B1 | * | 11/2001 | Lai et al. | 16/338 |
| 6,336,252 B1 | * | 1/2002 | Bando | 16/307 |

FOREIGN PATENT DOCUMENTS

| | | |
|---|---|---|
| JP | 57-167912 | 10/1982 |
| JP | 58-225217 | 12/1983 |
| JP | 5-71529 | 3/1993 |

* cited by examiner

Primary Examiner—Chuck Y. Mah
(74) Attorney, Agent, or Firm—Lorusso & Loud

(57) ABSTRACT

This invention relates to a hinge providing a pivotal connection, with a braking force against pivoting between a cylindrical holding body and a shaft body. The hinge includes a cylindrical holding body having a circular section hollow portion and provided with a mounting part, a shaft body having, at its tip, a cylindrical portion in which at least one axially extending slot is formed and a mounting part on the base end side of the cylindrical part, and a spring press-fitted into a portion of the cylindrical part where the slot is formed. The portion of the cylindrical part where the slot is formed, in turn, is press-fitted into the hollow of the cylindrical holding body. Since the independent spring is press-fitted into the cylindrical part of the shaft body, the hinge acts a stable braking force on the pivoting motion between the cylindrical holding body and the shaft body over a long period of time without age-based reduction in elastic force of the spring 3, even if frequently operated.

6 Claims, 6 Drawing Sheets

HINGE

TECHNICAL FIELD

This invention generally relates to a hinge, and more particularly, to a hinge, which provides braking force against pivoting at all times.

A hinge of this type is used for mounting a flap body such as a liquid crystal display to the body of a device such as a laptop personal computer (a notebook personal computer) and a desktop personal computer equipped with a liquid crystal display, for instance. Braking action of the hinge permits the flap body mounted with the hinge of this type to maintain the state of inclination at a desired angle to the body of the device.

BACKGROUND ART

A description will now be given of the hinge of this type in the prior art with reference to FIGS. 7 and 8.

FIG. 7 is an exploded sectional view showing a hinge in the prior art, and FIG. 8 is a sectional view taken along line C—C indicated by arrows in FIG. 7.

As shown in FIG. 7, a hinge 4a is composed of a cylindrical holding body 4 having a circular section hollow part 40 open to one end side and provided with a mounting part 41 on the other axial end side of the hollow part 40, and a shaft body 5 having a cylindrical part 50 open to one end side and provided with a mounting part 51 on the other axial end side of the cylindrical part 50.

Each of the mounting parts 41, 51 is adapted as a means of mounting the cylindrical holding body 4 and the shaft body 5 to a device, and an appropriate number of mounting holes 42, 52 are provided in the mounting parts 41, 51, respectively.

A small bore portion 40a, slightly smaller in diameter than the remainder of hollow 40, is formed at the inner bottom part of the hollow 40 in the cylindrical holding body 4. A pair of slots 50a, 50a is formed on the open side of the cylindrical part 50 of the shaft body 5. A portion of the cylindrical part 50 where the slots 50a, 50a are formed is press-fitted in the small bore part 40a of the hollow part 40 in the cylindrical holding body 4.

Since the material of the shaft body 5 is steel or the like subjected to carbonitriding, for instance, and the cylindrical part 50 of the shaft body 5 is provided with the slots 50a for elasticity, the cylindrical holding body 4 and the shaft body 5 are braked in the pivotal direction by the elastic action of the cylindrical part 50.

By selection of material for the shaft body 5, as well as by selection of size for the portion of the cylindrical part 50 where the slots 50a are formed, an elastic force, increasing in the circumferential direction, acts as a braking force against pivoting motion where the cylindrical part 50 is press-fitted in the hollow part 40.

The hinge 4a is used for mounting a flap body 61, serving as a display, on the body 60 of a device 6 such as a notebook personal computer, for example as shown in FIG. 9. In mounting the flap body 61 on the body 60, one of the mounting parts 41, 51 is fixed to the body 60, while the other is fixed to the flap body 61 with screws or the like (not shown).

As described above, the hinge exerts a specified braking force on the pivoting motion between cylindrical holding body 4 and the shaft body 5. Thus, when raising the flap body 61 to a desired angle, the braking force exceeds the weight of the flap body 61 in the closing direction and, as a result, the flap body 61 maintains its raised position without falling down.

Since the hinge in the prior art is structured so that the elastic force at the tip part of the cylindrical part 50 in the shaft body 5 applies a specified braking force on the portion where the cylindrical part 50 is press-fitted in the hollow part 40 as described the above, and the cylindrical part 50 of the shaft body 5 also exerts a braking force. However, frequent operation of the flap body 61 causes an age-based reduction in elastic force of the cylindrical part 50, resulting in a reduction in the braking force, shortening the life of the hinge.

Further, since the weight of the flap body normally varies according to the types of device, there is a need for manufacture of a different shaft body 5 for every different type of device, resulting in higher hinge manufacture cost. Furthermore, while the selection of material for the shaft body 5 and of size for the cylindrical part 50 permit adjustment of the circumferential elastic force at the tip of the cylindrical part 50 in the shaft body 5, it is difficult to adjust the braking force to meet required limits for the reason that the cylindrical part of the shaft body 5 is also used to exert the elastic force required for braking action. Thus, a hinge exerting an excessive braking force is in use in most cases.

Accordingly, it is an object of the present invention to provide a hinge providing a braking force against pivotal motion at all times, wherein an age-based reduction in braking force due to the frequent use of a flap body is prevented, thereby ensuring long life.

Another object of the present invention is to provide a hinge which makes it possible to use a common shaft body for different types of devices with various flap body weights, resulting in a reduction in manufacture cost.

A further object of the present invention is to provide a hinge which permits easy adjustment of braking force to meet required limits in a connecting part between a cylindrical holding body and a cylindrical part of a shaft body.

DISCLOSURE OF THE INVENTION

In a first embodiment of the present invention the hinge comprises a cylindrical holding body 1 having a circular section hollow part 10 and provided with a mounting part 11, a shaft body 2 having, at its tip, a cylindrical part 20 in which at least one axially extending slot 20a is formed and provided with a mounting part 21 at a base end side of the cylindrical part 20, and a spring 3 press-fitted into the cylindrical part 20 at the portion where the slot 20a is formed. The portion of the cylindrical part 20 with the slot 20a is press-fitted in the hollow part 10 of the cylindrical holding body 1.

A hinge in a second embodiment of the present invention is characterized in that the interior of the hollow part 10 of the cylindrical holding body 1 according to the first embodiment is modified by provision of a small bore 10a slightly smaller in diameter than the remaining portion of the hollow 10, and the portion of the cylindrical part 20 with slot 20a is press-fitted in small bore portion 10a.

A hinge in a third embodiment of the present invention is characterized in that the spring 3 in the hinge of the first or second embodiment is modified to include a circular-arc section spring pin having a slit 30 extending along the longitudinal direction.

A hinge in a fourth embodiment of the present invention is characterized in that the spring 3 of the hinge according of the third embodiment is press-fitted in the hollow part 10 of the cylindrical holding body 1 such that the slit-shaped part 30 of the spring 3 is circumferentially aligned with the slot 20a of the cylindrical part 20. Preferably, the hinge according to each of the above embodiments has a pin 23 inserted in the base end side of the cylindrical part 20 of the shaft body 2, and also a slot 10b of a predetermined circumferential length in the hollow part 10 of the cylindrical holding body 1 serving to guide pin 23. Preferably, the hinge also has a solid part 20b on the base end side of the cylindrical part 20, and the pin 23 is a spring pin inserted into the solid part 20b.

BEST MODE OF EMBODYING THE INVENTION

Figure 1:
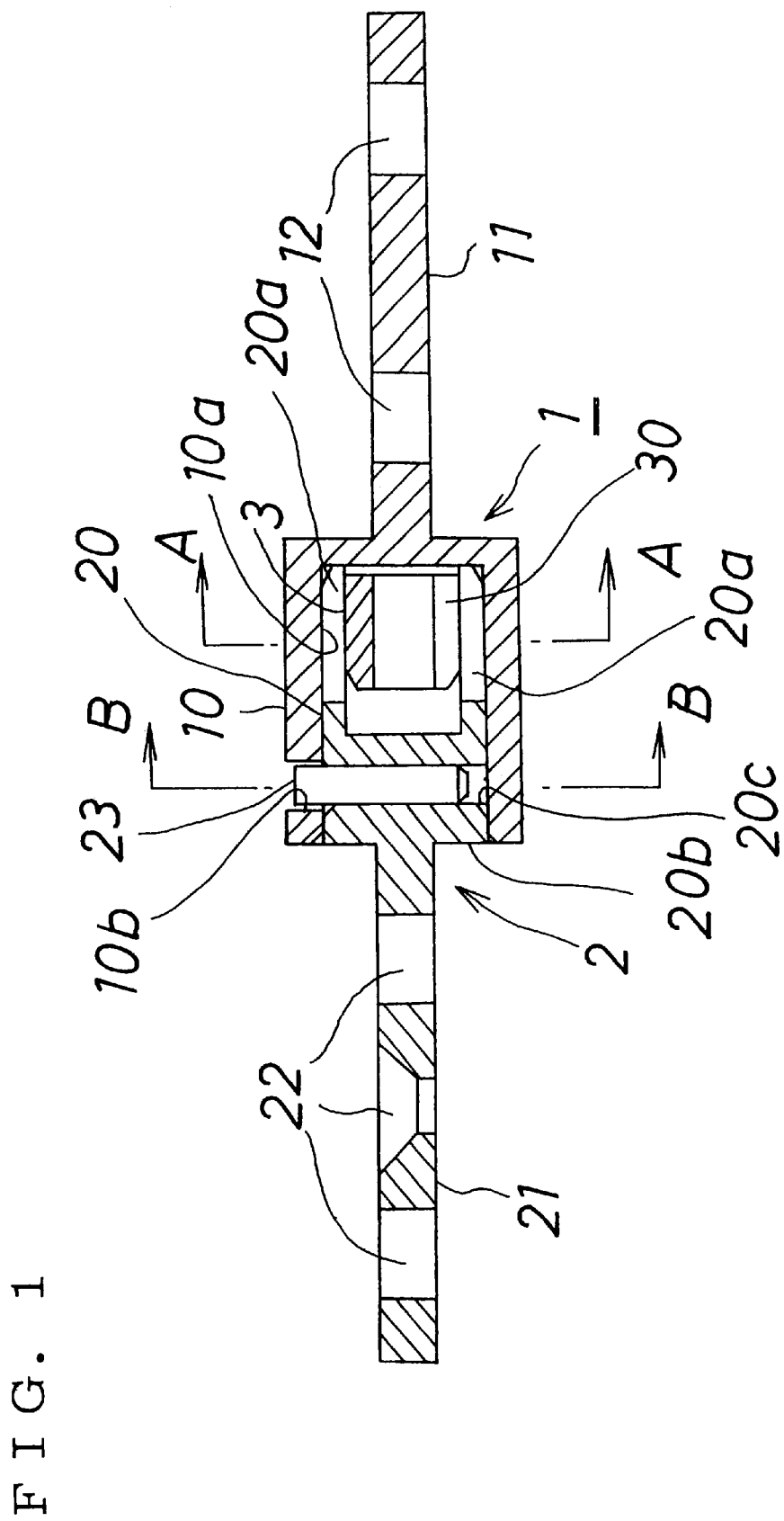
FIG. 1 is a sectional view showing a hinge in an embodiment according to the present invention.
Figure 2:
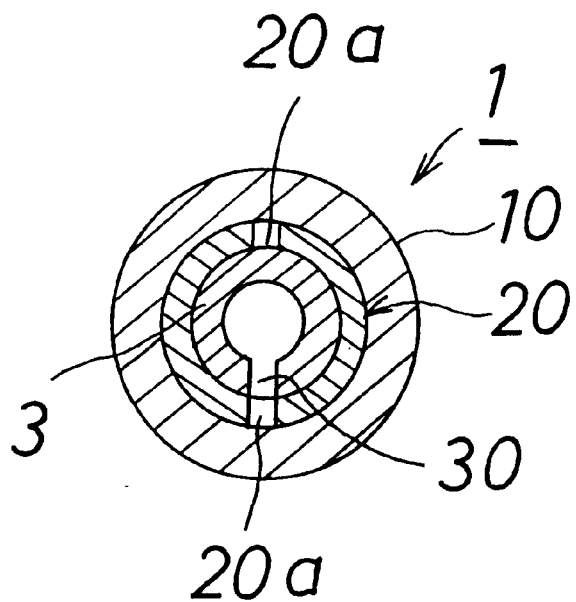
FIG. 2 is a sectional view taken along line A—A indicated by arrows in FIG. 1.

As shown in FIGS. 1–4, a hinge of an embodiment according to the present invention comprises a cylindrical holding body 1, a shaft body 2 and a spring 3.

The cylindrical holding body 1 has a circular section jack-shaped hollow part 10 open at one end and is provided with a mounting part 11 at the other axial end of the hollow part 10, in one united body. A small bore portion 10a, slightly smaller in diameter than a tip portion, is formed close to the bottom of the hollow part 10.

The shaft body 2 has, at its tip, a hollow plug-shaped cylindrical part 20 in which a pair of axially extending slots 20a is formed, and is provided with a mounting part 21 on the base end side of the cylindrical part 20 in one united body.

Each of the mounting parts 11, 21 is adapted for mounting the cylindrical holding body 1 and the shaft body 2 to the equipment, and an appropriate number of mounting holes 12, 22 are provided, respectively, in the mounting parts 11, 21.

The material of the cylindrical holding body 1 and the shaft body 2 may be steel or the like, which is subjected to only nitriding or carbonitriding according to the carbon content of the material, after having been cast into the illustrated shapes.

The spring 3 is press-fitted into that portion of the cylindrical part 20 wherein the slots 20a are formed, and exerts an elastic force tending to slightly expand the tip portion of the cylindrical part 20. The tip of the cylindrical part 20 where the spring 3 is press-fitted is, in turn, press-fitted into the small bore 10a so that the elastic force of the spring 3 acts as a braking force on the small bore part 10a of the hollow part 10 of the cylindrical holding body 1.

In the above embodiment, the spring 3 is a circular-arc section spring pin having a longitudinal slit 30, and is formed from a carbon steel sheet (SAE1065 or SAE1070, for example) or a stainless steel sheet, into an illustrated shape before heat treatment. It is preferable that the elastic force of the spring 3 in the above embodiment act uniformly on the opposing sides of the slots 20a, 20a of the cylindrical part 20 in FIG. 2 by press-fitting the spring 3 into the cylindrical part 20 such that one slot 20a of the cylindrical part 20 circumferentially aligns (overlaps) with the slit 30 of the spring 3.

The tip of the hollow part 10 of the cylindrical holding body 1 is provided with a slot 10b of a predetermined circumferential length, while the circumferential part on the base end side of the cylindrical part 20 in the shaft body 2 is provided with a pin 23, which is received in the slot 10b without projecting therefrom. In the above embodiment, the base end side of the cylindrical part 20 is provided with a solid part 20b, and the pin 23 is a spring pin press-fit into a pin hole 20c formed in the solid part 20b.

Figure 3:
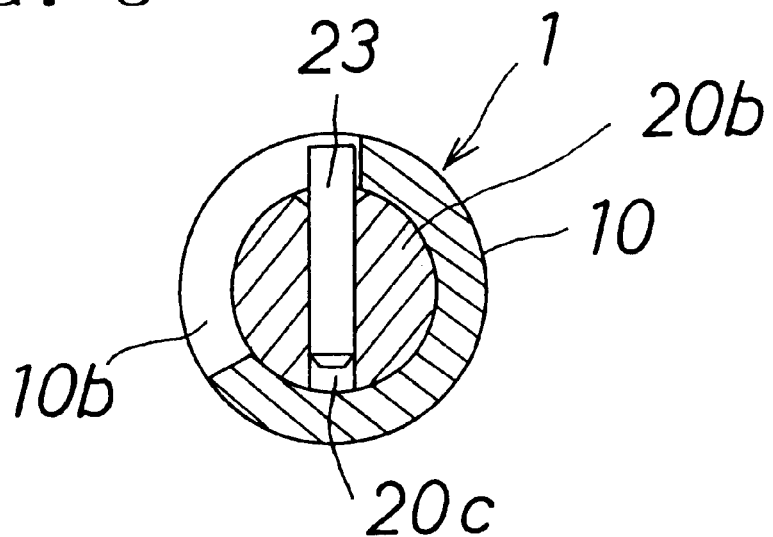
FIG. 3 is a sectional view taken along line B—B indicated by arrows in FIG. 1.

The pin 23 and the slot 10b are adapted as a means of regulating the pivotal range of the shaft body 2 about the cylindrical holding body 1 (or that of the cylindrical holding body 1 about the shaft body 2), and the slit 10b has a length sufficient to permit pivotal motions of the pin 23 within the angle range of 120 degrees circumferentially, as shown in FIG. 3.

Figure 4:
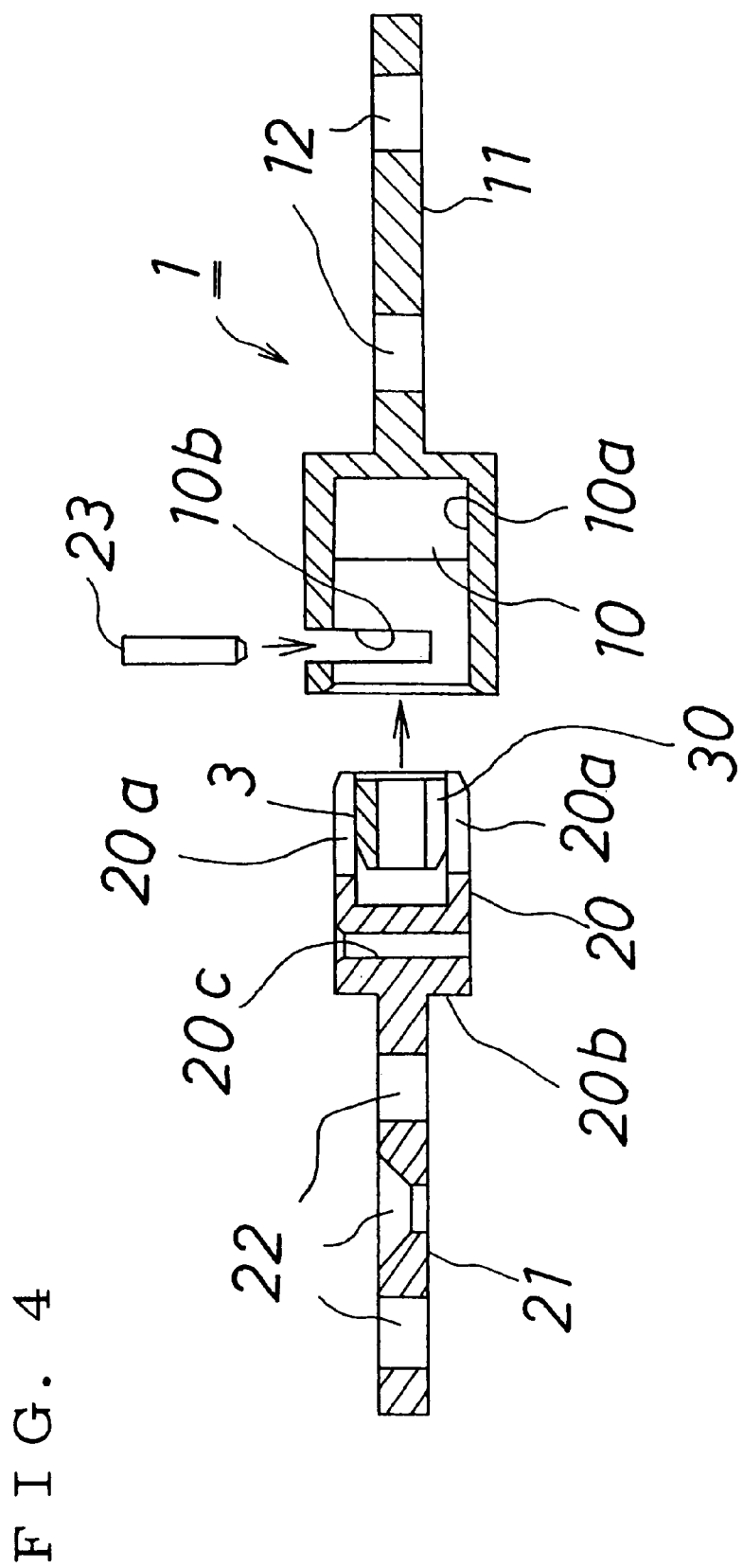
FIG. 4 is an exploded sectional view showing the hinge of FIG. 1.

In assembling the hinge, the pin 23 is mounted in the cylindrical part 20 as shown in FIG. 4 by the steps of press-fitting the spring 3 into the tip (within the portion where the slot 20a is formed) of the cylindrical part 20 of the shaft body 2, then press-fitting the tip portion of the cylindrical part 20 into the small bore portion 10a in the hollow part 10 of the cylindrical holding body 1, and then press-fitting the spring pin 23 into the pin hole 20c of the cylindrical part 20 through the slot 10b of the hollow part 10.

Figure 9:
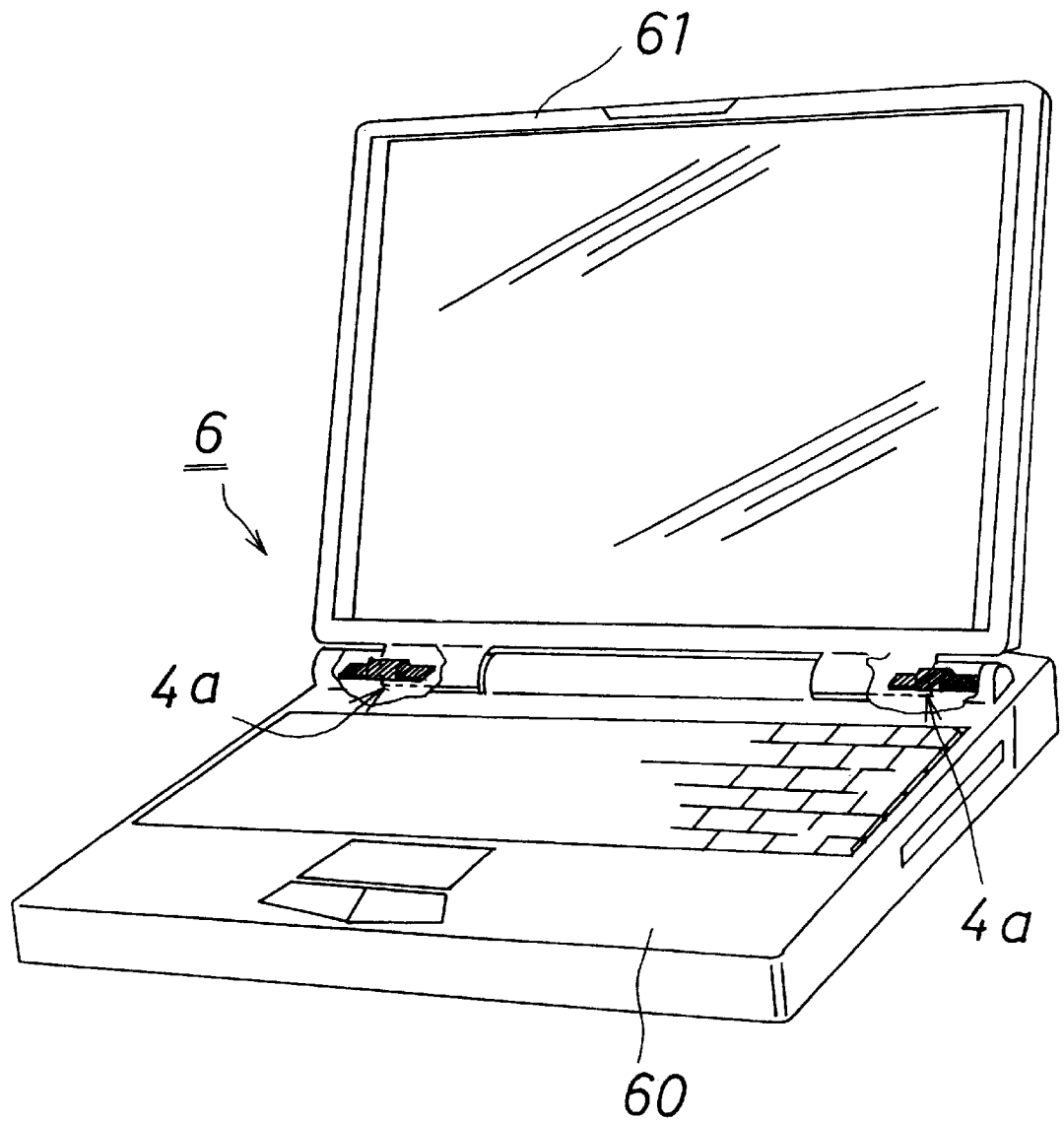
FIG. 9 is a partly broken-away perspective view showing the state that an apparatus body and a flap are combined together with a hinge of the present invention.

The hinge in the above embodiment is used for mounting the flap body 61 to the body 60 in the device 6 as shown in FIG. 9, similarly to the hinge in the prior art. One of the mounting parts 11 and 21 is fixed to the body 60 with screws (not shown), while the other is fixed to the flap body 61 with similar means.

The hinge in the above embodiment exerts a braking force, in the form of the elastic force of the spring 3, on a connecting part between the tip portion of the cylindrical part 20 and the small bore portion 10a of the hollow part 10. Thus, when the hinge is incorporated into a device as shown in FIG. 9 to raise the flap body 61 to an inclination at a desired angle to the body 1, the inclination of the flap body 61 is maintained as is.

Since the independent spring 3 is press-fitted into the rotatably connecting part between the cylindrical holding body 1 and the shaft body 2, the hinge according to the present invention shows much less age-based reduction in the elastic braking force even if frequently pivoted and, as a result, the hinge life may be maintained over a long period of time.

The hinge may be designed to easily produce a desired braking force by selecting the size (the length or the material thickness) of the spring 3, thus determining the elastic force thereof.

Further, since the braking force acting on the rotatably connecting part between the cylindrical holding body 1 and the shaft body 2 may be varied by an exchange of only the spring 3, a common shaft body is available for the different types of devices with variations in flap body weight as well. Thus, the manufacture cost of the hinge may be reduced.

In the hinge according to the present invention, when there is a need for swing motion of the flap body 61 within only a certain angle range in view of the design of device, it is preferable that the round part on the base end side of the cylindrical part 20 be provided with the pin 23, while the hollow part 10 of the cylindrical holding body 1 is provided with the slot 10b of a predetermined circumferential length so as to permit the pin 23 to be guided as described above.

However, when the device is provided with a means of regulating the swing range of the flap body 61 or there is no need for regulation of the swing range of the flap body 61, the hinge itself requires no means for regulating the swing range as described the above.

In the hinge according to the present invention, it is preferable that the spring 3 be formed as a spring pin of the above-described structure for the reasons that the spring may be easily press-fit into the cylindrical part 20, thus permitting easy adjustment of the elastic force while providing a relatively large braking force on the rotatably connecting part between the cylindrical holding body 1 and the shaft body 2.

Figure 5:
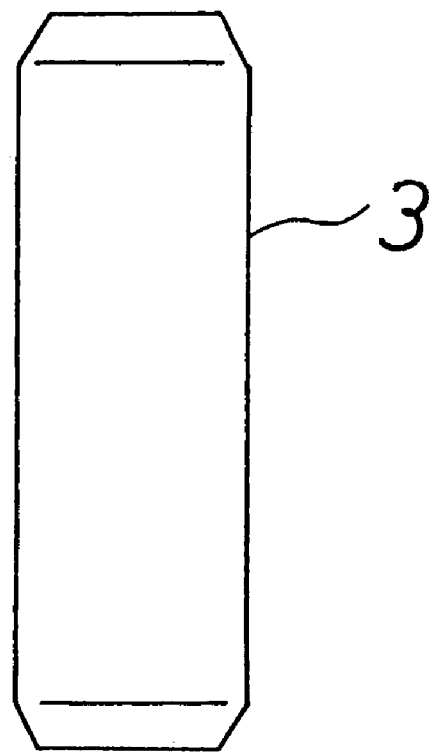
FIG. 5 is a plan view showing a modification of a spring for use in a hinge according to the present invention.
Figure 6:
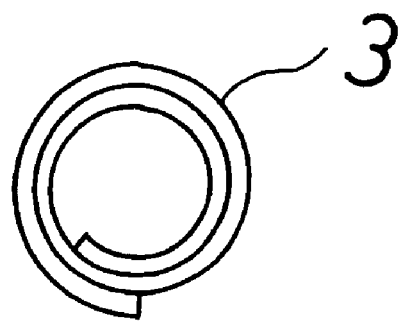
FIG. 6 is a sectional view showing the spring of FIG. 5.
Figure 7:
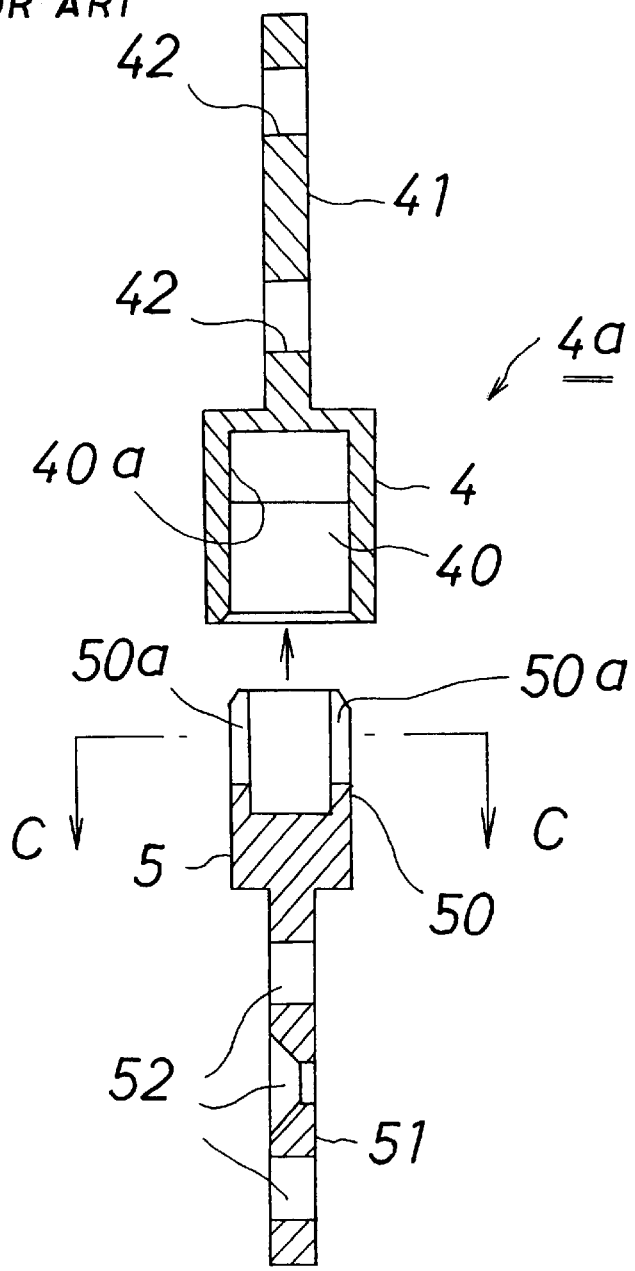
FIG. 7 is an exploded sectional view showing a hinge in the prior art.
Figure 8:
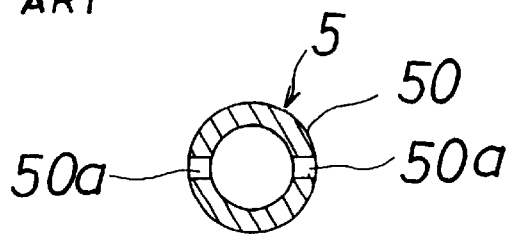
FIG. 8 is a sectional view taken along line C—C indicated by arrows in FIG. 7.

Alternatively, a spring pin formed in a spiral shape by rolling a thin steel sheet or a stainless steel sheet of a predetermined width a predetermined number of turns or a normal coil spring as shown in FIGS. 5 and 6 may also be used. In addition to the above springs, a volute spring or other spring may be also used if having a structure which makes it possible to exert the elastic force circumferentially on the portion of the cylindrical part 20 where the slot 20a is formed.

Further, the spring 3 may be used in a multiple overlapped arrangement in the circumferential direction.

The hinge according to the present invention may be used not only for a notebook personal computer but also for all devices and appliances requiring a flap body inclined at a desired angle to the main body in use. Thus, the structure of the devices or the appliances requiring the hinge for the mounting parts 11, 21 of the cylindrical holding body 1 and the shaft body 2 is not limited to the above configuration. For similar reasons, the mounting part 11 of the cylindrical holding body 1 may be formed at the circumferential part of the hollow part 10, instead of at one end of the hollow part 10 as described the above. Further, the base part of the cylindrical part 20 of the shaft body 2 may be formed in the shape of a projection from the hollow part 10 of the cylindrical holding body 1 to provide the mounting part 21 at the circumferential part of the projected base part.

The hinge as defined in claim 1 according to the present invention permits less age-based reduction in elastic force of the spring 3 if subject to frequent operation, for the reasons that the spring 3 is press-fitted into the portion of the cylindrical part 20 in the shaft body 2 where the slot 20a is formed, and the portion of the cylindrical part 20 where the spring 3 is press-fitted is, in turn, press-fitted in the hollow part 10 of the cylindrical holding part 1. Thus, a stable braking force may be exerted over a long life.

Further, since the spring 3 is independent of the cylindrical part 20 of the shaft body 2, the common shaft body may be used for the hinge even in different types of equipment with variations in flap body weight, resulting in a reduction in manufacture cost.

Since the elastic force of the spring 3 may be easily adjusted by selecting the size (the length, the material thickness, the wire diameter or the like) of the spring 3, the braking force acting on the rotatably contacting part between the cylindrical holding body 1 and the shaft body 2 is also easily adjusted to meet required limits.

The hinge as defined in claim 2 makes it easier to press-fit the tip of the cylindrical part 20 into the hollow part 10, for the reasons that the interior of the hollow part 10 of the cylindrical holding body 1 is provided with the small bore portion 10a slightly smaller in diameter than the remainder of hollow 10, and the portion of the cylindrical part 20 where the slot 20a is formed is press-fitted into the small bore 10a.

The hinge exerts a large braking force, and permits press-fitting into the cylindrical part 20 and adjustment of the elastic force more easily, when the spring 3 is formed as a circular-arc section spring pin having the longitudinal slit 30.

The hinge may exert the elastic force of the spring 3 on the rotatably connecting part between the cylindrical holding body 1 and the shaft body 2 more uniformly, if the spring 3 is press-fitted into the hollow part 10 of the cylindrical holding body 1 with the slit 30 circumferentially aligned with the slot 20a of the cylindrical part 20.

What is claimed is:

1. A hinge, comprising:

a cylindrical holding body having a circular section hollow and a mounting portion;

a shaft body having, at one end, a cylindrical part in which at least one axially extending slot is formed and a mounting part at an end opposite the cylindrical part; and a spring press-fitted into a portion of said cylindrical part where the slot is formed;

wherein the portion of said cylindrical part where the slot is formed is press-fitted into the hollow of the cylindrical holding body.

2. A hinge according to claim 1, wherein an inside portion of said hollow is provided with a small bore slightly smaller in diameter than the remaining portion of said hollow, and the portion of the cylindrical part where the slot is formed is press-fitted into the small bore.

3. A hinge according to claim 2, wherein said spring is a circular-arc section spring pin having a slit extending along a longitudinal dimension of said spring.

4. A hinge according to claim 3, wherein said spring is press-fitted into said hollow with the slit of said spring circumferentially aligned with the slot of the cylindrical part.

5. A hinge according to claim 1, wherein said spring is a circular-arc section spring pin having a slit extending along a longitudinal dimension of said spring.

6. A hinge according to claim 5, wherein said spring is press-fitted into said hollow with the slit of said spring circumferentially aligned with the slot of the cylindrical part.

* * * * *